Jan. 17, 1956     K. A. S. KARLSTRÖM     2,730,902
VIBRATOR
Filed Nov. 22, 1952
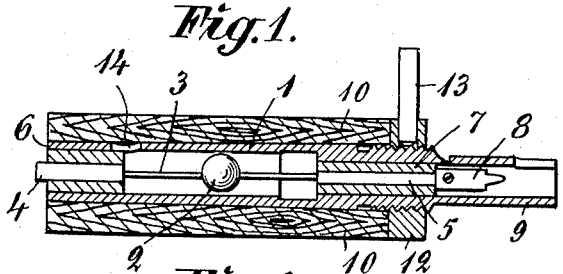
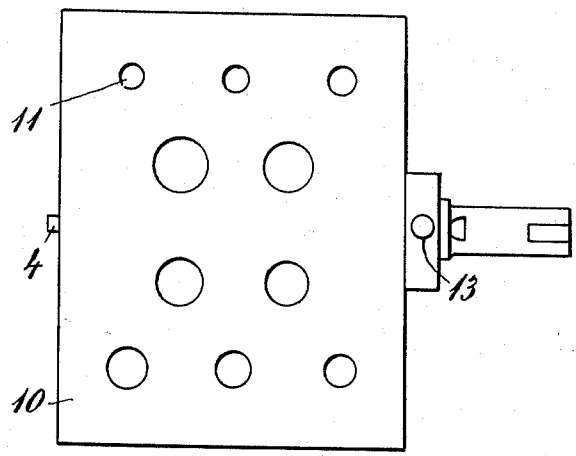
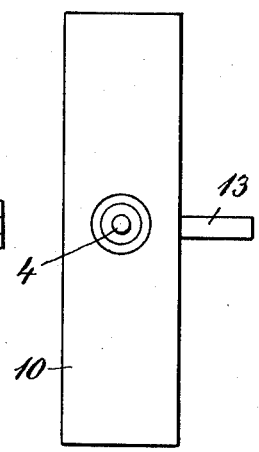
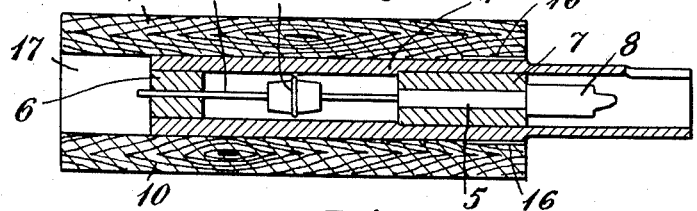
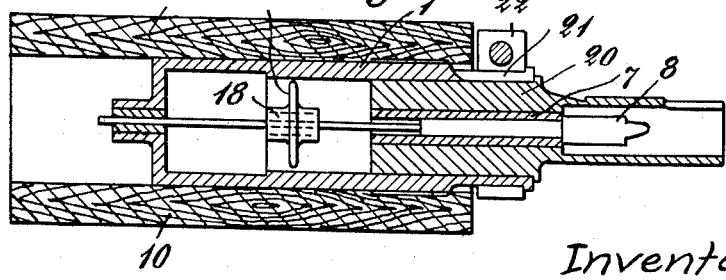
Inventor
Karl Alex Sam Karlström
By Robert E. Burns
Attorney United States Patent Office 2,730,902
Patented Jan. 17, 1956

2,730,902
VIBRATOR
Karl Axel Sam Karlstrom, Gavle, Sweden
Application November 22, 1952, Serial No. 322,019
8 Claims. (Cl. 74—87)

The present invention refers to vibrators of the kind where the vibrations are generated by the rolling of a roll body secured on a resilient spindle on the inside of a hollow, for instance cylindrical impulse member. In previously known vibrators of this type the roll body is secured to the outer end of a cantilever arm, which at the same time constitutes the spindle of rotation of the roll body and which is mounted only at the end remote from the roll body. Such an arrangement of the rotating members has been found to bring about practical drawbacks, particularly in vibrators with oscillatory frequencies of a magnitude of 5,000–20,000 oscillations per second. The roll body may thus be caused to take an oblique position relatively to the rolling track owing to the resiliency of the spindle, whereby irregular oscillatory movements might be created. To this also contributes the circumstance that the spindle, which in the construction in consideration must have a comparatively large mass relatively to that of the roll body, is permitted to perform transverse oscillations that may combine with the oscillations of the roll body and affect the movement thereof adversely.

Said disadvantages are avoided according to the present invention by the feature that the spindle of the roll body is mounted bilaterally in bearings in the impulse member, the roll body being arranged between the two bearings, preferably midway of the free portion of the spindle extending between the same. The spindle may consequently oscillate symmetrically, so that the roll body will always rotate and roll in the same path. Furthermore, the diameter of the spindle and thus the mass thereof may be considerably reduced. Thus one may advantageously use a spindle of resilient steel wire, so-called piano-wire. Owing to the uniform motion of the roll body it will be possible to construct vibrators of this kind for a very high oscillatory frequency. As is well known, the oscillatory frequency is proportional to the ratio between the diameter of the roll body and the difference between the diameters of the rolling track and the roll body. To attain high frequencies, the diameter of the roll body must therefore be chosen relatively great. In the known construction of such vibrators it would not be possible to attain high frequencies owing to the irregular movements apt to occur with the use of roll bodies of great diameters. By arranging and mounting the roll body in accordance with the present invention a movement of the roll body is attainable which is so uniform that oscillatory frequencies may be obtained within the range of ultra-sounds.

The invention will be described more closely with reference to the accompanying drawing, which illustrates various embodiments of a vibrator according to the invention. Fig. 1 is a vertical section through the vibrator according to a first embodiment. Figs. 2 and 3 show the vibrator viewed from above and from the end, respectively. Fig. 4 is a vertical section through a second embodiment, and Fig. 5 is a vertical section through a third embodiment of the vibrator.

In the construction shown in Figs. 1–3, the impulse member consists of an internally cylindrical sleeve 1 having a roll body in the form of a ball 2 rotatably mounted therein. The ball is secured on a spindle 3, which preferably consists of steel wire, for instance so-called piano-wire, which is secured at the ends thereof in journals 4, 5, which are mounted in bushings 6, 7 coaxially with the cylindrical surface 1, said bushings being inserted in the end portions of the sleeve. The journal 5 is connected to a coupling member 8 for the coupling of the spindle to a motor-driven shaft, the corresponding coupling member of which is intended to be introduced into a continuation 9 of the sleeve 1.

The ball 2 is arranged midway of the portion of the spindle extending freely between the bearing bushes and has a diameter which is smaller than the internal diameter of the sleeve. When the spindle rotates, the ball will consequently roll on the inside of the sleeve through the influence of the centrifugal force, the number of revolutions of the ball in its rolling motion being proportional to the product of the number of revolutions of the spindle and the diameter of the ball and inversely proportional to the difference between the diameters of the rolling track and of the roll body. Owing to the mounting described, the roll body and the spindle will oscillate symmetrically with a regular movement which makes it possible to reduce said difference between the diameters of the rolling track and the roll body to a considerable extent in order thus to increase the frequency, conditions remaining otherwise the same.

The sleeve 1 is secured in a vibrating member, which in the example illustrated consists of a plate 10. The sleeve is conical externally and pressed into a conical bore in the plate with a fit such as to be prevented from turning relatively to the plate under the influence of the occurring turning forces acting upon the sleeve 1, when the roll body rotates. The plate 10 is preferably made from wood or other material with inferior heat-conducting properties, for the purpose of preventing transfer of heat from the sleeve 1 to the objects intended to be placed on the plate 10. These objects may consist, for instance, of receptacles containing materials to be vibrated. For securing the receptacles to the plate apertures 11 may be provided in the plate, into which the receptacles or bottom studs on the same may be inserted. In certain cases it might be suitable to secure the object in consideration, such as a pattern of a tooth prothesis, on the plate by means of a thermoplastic mass, which is first secured to the pattern and, while still being soft, is pressed into an aperture in the plate, where it solidifies and anchors the pattern firmly. To make retracting of the sleeve 1 out of the plate possible, the sleeve is threaded at the end thereof projecting from the plate and provided with a nut 12, which when screwed in is set against the side of the plate so as to displace the sleeve outwardly. For the turning of the nut a pin 13 may be made use of, said pin permitting of being introduced into a radial hole in the nut. The roll body and the spindle are accessible for inspection and introduction of lubricant through an aperture 14 in the sleeve 1.

The embodiment shown in Fig. 4 differs from the embodiment just described substantially only in that the roll body is of a double-conical shape and provided at the middle thereof with a radially projecting flange 15 coinciding with a plane at right angles to the axis. The flange is relatively narrow and provided with a rounded edge surface, by which the roll body rolls on the inside of the sleeve 1. This construction has the advantage that dirt and dust particles cannot penetrate in between the flange and the roll track and remain there to disturb the rolling motion. In the example shown, the spindle 3 is mounted by means of a special journal 5 only at one end of the sleeve, whereas the spindle is directly mounted in the bushing 6 at the other end of the sleeve.

In this embodiment, the sleeve 1 is cylindrical also on the outside, the sleeve being non-rotatably connected to the plate by means of ridges 16 provided at one end of the sleeve, said ridges penetrating into the wall of the plate-bore 17 when the sleeve is pressed into said bore.

In the embodiment shown in Fig. 5, the roll body takes the form of a disk 19 provided with a hub 18, said disk corresponding to the flange 15 in Fig. 4; as is the case with the flange 15, the disk 19 is of a small thickness and presents a rounded edge surface. This form of the roll body is suitable in connection with high oscillatory frequencies, because it can be made with a great diameter and a small mass.

In this case, the bearing bush 7 is inserted into a special sleeve 20, which is in turn inserted into one end of the sleeve 1. This arrangement makes it possible to pull the roll body with its associated spindle and bearing out of the sleeve 1, without it being necessary to loosen the latter from the plate 10. The sleeve 1 is provided at one end with a longitudinally extending slit 21, and is connected to the sleeve 20 by means of a screw clamp 22. In this embodiment, the coupling member 8 is arranged in a continuation of the sleeve 20.

To prevent turning of the sleeve 1 relatively to the plate, the sleeve may externally be of an angular cross section. If desired, the plate 10 may be made integral with a receptacle intended to receive the material to be vibrated.

A vibrator of the type described above may be used for a great variety of purposes, for instance in dentistry for the vibration of amalgam or materials having the characteristics of plaster in the making of patterns. It may also be constructed without a plate attached to the same, and the impulse member 1 may in such case be provided with tools of various kinds for working at vibration, such tools being, for instance a spatula, chisel, knife, grinding trundle, impact bore or the like.

What is claimed is:

1. A vibrator comprising, in combination, a hollow impulse body having an inner surface of revolution, a pair of spaced-apart bearings in said impulse body, a shaft rotatably mounted in said bearings with said shaft lying in a position parallel with the axis of said inner surface of revolution, and a roll body secured to said shaft between the pair of bearings and having a diameter smaller than the diameter of said surface of revolution, said shaft being flexible to permit the roll body to undergo planetary movement in rolling contact with said surface of revolution.

2. A vibrator as defined in claim 1, wherein the flexible shaft is coaxial with the surface of revolution of the impulse member.

3. A vibrator as defined in claim 1, wherein the roll body is positioned midway between the pair of bearings.

4. A vibrator as defined in claim 1, wherein the shaft consists of flexible steel wire and the end portions of said wire are secured in non-flexible shafts journalled in the pair of bearings coaxially with the axis of the surface of revolution.

5. A vibrator as defined in claim 1, wherein the roll body has an axially wide hub portion and an axially narrow central portion, the central portion being adapted to engage the surface of revolution.

6. A vibrator as defined in claim 5, wherein the roll body is in the form of a disc having a rounded edge surface, said disc being mounted on said wire for rotation in a radial plane.

7. A vibrator as defined in claim 1, further comprising means providing a support surface for articles to be vibrated, said means being non-rotatably connected to said hollow impulse body.

8. A vibrator as defined in claim 7, wherein said means for supporting articles to be vibrated is formed from non-metallic material having a low heat conductivity.

References Cited in the file of this patent

UNITED STATES PATENTS

| Number | Name | Date |
|---|---|---|
| 2,167,987 | Mall | Aug. 1, 1938 |
| 2,284,090 | Hotchkiss | May 26, 1942 |
| 2,546,806 | Wenander | Mar. 27, 1951 |